United States Patent Office 2,841,568
Patented July 1, 1958

2,841,568

COMPOSITIONS OF ACRYLONITRILE POLYMERS AND ETHYLENE OXALATE AND PROCESS FOR PREPARING SAME

Alfred B. Craig and Eugene L. Ringwald, Decatur, Ala., assignors to The Chemstrand Corporation, Decatur, Ala., a corporation of Delaware No Drawing. Application October 13, 1955
Serial No. 540,331

7 Claims. (Cl. 260—30.4)

This invention relates to new compositions of matter and products prepared therefrom. More particularly, the invention is concerned with the production of new solutions of acrylonitrile polymers and to shaped articles such as films, filaments, sheets, ribbons, tubes and the like, which can be formed from the new solutions.

This application is a continuation in part of our copending application Serial No. 279,250, filed March 28, 1952, now abandoned.

"Polymers," as employed throughout the instant specification and claims, is intended to include polyacrylonitrile, copolymers and terpolymers containing at least 70% by weight in the polymer molecule of acrylonitrile, and blends of polymeric acrylonitrile and copolymers of acrylonitrile with polymers and copolymers of other polymerizable mono-olefinic monomers.

While the present invention is applicable to the preparation of various shaped articles, such as are enumerated above, from polymeric compositions comprising acrylonitrile polymers, for purposes of simplicity of description the invention will be described as it is applicable to the formation of fibers and filaments. It is to be understood, however, that this is merely intended in an illustrative sense and the invention is not to be limited thereby but only insofar as the same may be limited by the appended claims.

It is well known that acrylonitrile polymers have excellent fiber-forming properties. The conventional technique of fiber preparation involves the dissolution of the polymer in a suitable solvent, and thereafter extruding the solution into a medium which removes the solvent from the solution and precipitates the polymer in continuous form. Heretofore, many known solvents have been employed to dissolve acrylonitrile polymers for the purpose of forming shaped articles therefrom. For example, various inorganic salts have been employed, such as zinc chloride, lithium bromide and the like. However, fibers spun by extrusion of aqueous salt solutions into coagulating baths which are non-solvents for the acrylonitrile polymers, usually contain large amounts of said salts. Fibers or other shaped articles containing these salts are not uniform and possess poor physical properties. Various organic solvents have also been employed for forming acrylonitrile polymer solutions, for the manufacture of shaped articles, such as fibers therefrom. However, many of these solvents are inferior with respect to solvent properties, or are too costly to provide economical fiber spinning conditions, or are too volatile or unstable at the temperatures employed in normal spinning operations.

The primary object of the present invention is to provide a new solvent for acrylonitrile polymers which is unusually effective in dissolving such polymers, and in addition, is economical and stable under normal spinning operations. Another object of the present invention is the preparation of more stable solutions of acrylonitrile polymers which can be readily formed into shaped articles. Another object of the present invention is to provide an improved method for preparing high tenacity fibers of acrylonitrile. Other objects and advantages of the present invention will be apparent from the description thereof hereinafter.

In general, the objects of the present invention are accomplished by dispersing the acrylonitrile polymer, in finely divided form, in ethylene oxalate, the monomeric cyclic ester formed by the reaction of ethylene glycol and oxalic acid, which is shown as follows:

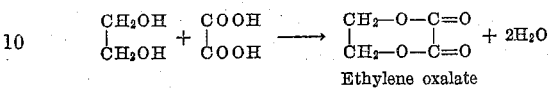
Ethylene oxalate

The dispersion is then heated with stirring, tumbling, or other agitation until a free-flowing, uniform, homogeneous solution is obtained. Usually heating to a temperature within the range of 135° to 200° C. is sufficient to bring about complete dissolution of the polymer. The ethylene oxalate solutions of acrylonitrile polymers are clear and homogeneous and readily susceptible to being formed and/or drawn into fibers, films, and the like by known and conventional procedures.

In the preferred practice of the invention the polymers of acrylonitrile are employed in a finely divided form. Although massive polymers may be ground to desirable size, the selection of a suspension polymerization procedure, in accordance with the principles set out hereinafter, will produce the desired subdivided state directly without resort to separate comminution procedures.

The polymers which may be dissolved in ethylene oxalate to form solutions for the production of shaped articles, as described herein, are polyacrylonitrile, copolymers of acrylonitrile with minor proportions of other mono-olefinic compounds polymerizable therewith, and mixtures of acrylonitrile polymers with other polymeric compositions, including olefinic polymers or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus, a polymer of monomeric mixture of which acrylonitrile is at least 70% of the polymerizable content, is useful in the practice of this invention. However, the solvent of the instant invention is capable of dissolving polymers of acrylonitrile containing any proportion of acrylonitrile.

Useful copolymers, other than polyacrylonitrile, are the copolymers of 80 or more percent of acrylonitrile and one or more percent of other mono-olefinic monomers. Suitable other monomers include, vinyl acetate and other vinyl esters of monocarboxylic acids, vinylidene chloride, vinyl chloride and other vinyl halides, dimethyl fumarate and other dialkyl esters of fumaric acid, dimethyl maleate and other dialkyl esters of maleic acid, methyl acrylate and other alkyl esters of acrylic acid, styrene and other vinyl substituted aromatic hydrocarbons, methyl methacrylate and other alkyl esters of methacrylic acid, methacrylonitrile, alpha-vinylpyridine and other vinyl substituted heterocyclic nitrogen ring compounds, such as the vinyl imidazoles, etc., the alkyl substituted vinylpyridines, vinyl chloroacetate, allyl chloroacetate, methallyl chloroacetate, allyl glycidyl ether, methallyl glycidyl ether, allyl glycidyl phthalate and the corresponding esters of other aliphatic and aromatic dicarboxylic acids, glycidyl acrylate, glycidyl methacrylate and other mono-olefinic monomers copolymerizable with acrylonitrile. Of particular utility are the comonomers which contain one polymerizable olefinic radical whereby the copolymerization with acrylonitrile may be effected and one acidic, basic or otherwise reactive group capable of bonding the dyestuff with which the ultimate fiber may be treated.

Many of the more readily available comonomers for polymerization with acrylonitrile, form copolymers which are not reactive with the dyestuffs and may therefore be impossible or difficult to dye by conventional techniques. Accordingly, these non-dyeable fiber-forming copolymers may be blended with polymers or copolymers which are in themselves more dye-receptive by reason of their physical structure or by reason of the presence of functional groups which are chemically reactive with the dyestuff, whereby the dyestuff is permanently bonded to the polymer in a manner which lends resistance to the usual laundering and dry-cleaning procedures. Suitable blending polymers may be polyvinylpyridine, polymers of alkyl substituted vinylpyridine, polymers of other vinyl substituted N-heterocyclic compounds, the copolymers of the various vinyl substituted N-heterocyclic compounds and other copolymerizable monomers, particularly acrylonitrile.

Of particular utility are the blends of non-dyeable acrylonitrile polymers of good fiber-forming properties for example, polyacrylonitrile or a copolymer of more than 90% acrylonitrile and up to 10% of vinyl acetate, and a copolymer of vinylpyridine or an alkyl substituted vinylpyridine and acrylonitrile, the said acrylonitrile being present in substantial proportions, for example 50 to 80% to provide heat and solvent resistance, and a substantial proportion of the pyridine or derivative thereof to render the blend receptive to acid dyestuffs. Of particular utility are the blends of copolymers of 90 to 98% acrylonitrile and 2 to 10% vinyl acetate and sufficient copolymer of 10 to 70% acrylonitrile and 30 to 90% vinylpyridine to produce a blended composition with a total of 3 to 8% by weight of vinylpyridine.

Other compositions suitable for blending with non-dyeable acrylonitrile polymers are: the polyamides prepared by condensing an alkylene diamine having up to six carbon atoms and a compound of the group consisting of crotonic acid, acrylic acid, methacrylic acid and the alkyl esters of these acids, wherein the alkyl radical has up to five carbon atoms; the polyamides prepared by condensing N-alkylazadinitriles with formaldehyde; the polyesters prepared by reacting dicarboxylic acids with glycols containing tertiary amino groups; and other polymers containing tertiary amino radicals capable of reacting chemically with the acid dyestuffs.

A further class of useful dye-receptive resins suitable for blending with the non-dye-receptive acrylonitrile polymers are the tertiary amino group containing polymers and copolymers described in the preceding paragraphs which have been reacted with aliphatic halides, for example butyl bromide, chloroacetic acid, methyl chloroacetate, with the esters of oxygen containing sulfur acids, which acids have ionization constants greater than $10^{-4}$, for example, methyl sulfate and methyl p-toluenesulfonate and with the various acids, such as sulfuric acid, hydrochloric acid and benzenesulfonic acid. By these reactions blending resins containing amino groups are converted to quaternary or tertiary ammonium salts, which are more dye-receptive than are the corresponding amino group containing resins.

Such polymers may be fabricated into fibers or films of unusual properties, for example, high tensile strength, unusual thermal and chemical stability, and exceptional resistance to solvents. The optimum combination of physical and chemical properties are found in the polymers and copolymers of larger proportions of acrylonitrile, for example in excess of 85%. It will be found that the practice of this invention with respect to the latter class of substances is most beneficial.

In the practice of this invention, as in the preparation of acrylonitrile fibers by prior art methods, the physical properties of the polymers are of substantial importance. It is desirable that the polymers be uniform with respect to molecular weight, particle size, and chemical composition. Accordingly, the methods for their preparation must be selected so as to induce the uniformity of chemical and physical properties. In general, the molecular weight should be in excess of 10,000 and preferably in excess of 25,000, the molecular weights being determined by measuring the viscosity of dilute solutions in the manner well known in the art.

It has been found that polymers and copolymers of desirable physical properties are those which are prepared by the aqueous suspension technique, wherein the monomers or mixture of monomers are added to an aqueous medium maintained under conditions suitable for a rapid but controlled polymerization. The aqueous medium should contain a water-soluble peroxy catalyst and a dispersing agent which induces the precipitation of a finely divided polymer during the reaction. In order to insure the optimum concentration of peroxy catalyst and dispersing agent it is frequently desirable to add the catalyst and dispersing agent continuously or intermittently throughout the course of the reaction. The preferred practice involves the charging of the monomers or mixtures of monomers, gradually during the course of the reaction at a uniform rate or at a varying rate which permits the maintenance of the reaction at a constant temperature, for example the reflux temperature.

The fiber-forming acrylonitrile polymers are prepared by polymerization in the presence of water-soluble peroxide catalysts, such as the alkali metal salts of the various peroxy acids, for example sodium perborate, sodium percarbonate, and potassium persulfate, stabilizing or dispersing agents, such as the water-soluble salts of the sulfonated mahogany acids, salts of the formaldehyde condensed naphthalene sulfonic acids, salts of sulfonated alkylbenzenes, salts of triethanolamine, sodium stearate and other salts of carboxylic acids, and mixtures thereof prepared by the saponification of animal and vegetable oils.

Desirable methods for the preparation of acrylonitrile polymers of uniform molecular weight involve the use of regulators, for example, tertiary dodecyl mercaptan, beta-mercaptoethanol, thioglycolic acid, beta-mercaptopropionic acid, and acetaldehyde. The nature of the other monomeric substances being polymerized with the acrylonitrile may determine the type of substance useful as a regulator. For example, in the copolymerization of acrylonitrile with monomers, such as vinyl acetate, methyl methacrylate, and styrene, thioglycolic acid is unusually beneficial. However, in the preparation of copolymers of the basic monomers, such as vinylpyridine, the use of tertiary aliphatic mercaptans will be found to be very effective.

It is desirable to use a solution of as high a concentration as possible, but the maximum concentration is dependent upon the molecular weight of the polymer and the viscosity characteristics of the polymer-solvent mixture. To obtain fibers of optimum physical properties polymers of molecular weights in excess of 25,000 are used, and with such polymers it is only possible to dissolve a relatively small proportion in the ethylene oxalate without exceeding practical viscosity values. Although as little as 5% of polymer can be used in the spinning solution, such low concentrations are undesirable because they necessitate the removal of too much solvent from the extruded solution, thereby increasing solvent recovery cost as well as reducing spinning speed and lengthening the period required for coagulation. The concentration of polymer in the spinning solution is usually between eight and 35 percent, but concentrations up to the maximum are practicable. The concentration of the polymer will ultimately be determined by considering the desired physical properties of the fiber and the speed of spinning, the latter depending upon the concentration and viscosity of the spinning solution. The viscosity will depend upon the chemical composition and molecular weight of the polymer, and the optimum concentration can best be determined by selecting a uniform high molecular weight polymer having good fiber-forming properties, and dissolving a given amount in as little of the ethylene oxalate as possible to form a viscous solution capable of being spun at convenient temperatures.

The fibers are spun by extruding the polymer solution through an orifice, or a spinneret having a plurality of orifices, into a medium which removes the ethylene oxalate. The volume of solution passed through the spinneret in a given time must be constant in order to produce a fiber of a uniform size. This is best achieved by using a positively driven gear pump adapted to deliver a constant flow of solution regardless of minor changes in viscosity and the variable resistance offered by the spinneret. It is also desirable to pass the solution, which has been prefiltered, through one or more additional filters before the spinneret to remove the last traces of foreign matter and particles of incompletely dissolved polymer. The polymers may be delivered to the gear pump by pressures applied by an inert gas to the solution reservoir, which is heated if necessary, to make the solution fluid enough to pass through the conduits. The extruding operation should be operated at elevated temperatures, but well below the boiling point of the solvent to facilitate the handling of the apparatus.

The medium into which the solution is extruded and which removes the solvent is preferably liquid. The method involving the use of liquids, known as "wet spinning," usually utilizes water, alcohol, salt solutions or any liquid which is a solvent for the ethylene oxalate, but in which the polymer is insoluble. The solvent is leached out of the stream of polymer solution which becomes a viscous stream and finally a solid filament. When a spinneret with a plurality of apertures is employed, the several streams of polymer converged to form a single strand or tow. The spin bath must necessarily be of sufficient size to permit the complete, or substantially complete, removal of the solvent. Obviously, the rapidity of extrusion will also affect the size of the spin bath, high speeds requiring longer baths. The temperature of the bath also affects the size, higher temperatures permitting more rapid diffusion of the solvent out of the fiber and thereby permitting the use of shorter baths.

In general, the methods of wet spinning which are in commercial use are readily adaptable to spinning solutions of polymers in ethylene oxalate. Similarly, conventional automatic machinery for spinning continuously, drying the thread if necessary, and winding it upon suitable spools can be used. As in the case of most synthetic fibers, those produced from the polymers of acrylonitrile, which are spun from ethylene oxalate solutions, must be oriented by stretching to develop optimum physical properties. If desired, part of this stretching may be accomplished in the spin bath, by drawing the fiber out of the bath more rapidly than the rate of extrusion.

Further details of the practice of the present invention are set forth with respect to the following examples, which are merely intended to be illustrative and not limitative.

Example I

Finely divided polyacrylonitrile (100%) was dispersed in ethylene oxalate. The dispersion was then heated to approximately 180° C. with stirring. A clear homogeneous solution or dope containing 10% solids was obtained. Fibers were readily drawn from the ethylene oxalate solution by conventional procedures.

Example II

A finely divided copolymer containing 95% acrylonitrile and 5% vinyl acetate by weight in the polymer molecule was dispersed in ethylene oxalate. Thereafter the dispersion was heated to a temperature of approximately 140° C. A clear homogeneous solution or dope containing 10% solids was obtained. The resultant solution was then passed through a spinneret under pressure into a water bath and the fibers thus formed were washed, dried, and steam-stretched for orientation. The fibers had excellent tensile and elongation properties.

Ethylene oxalate solutions of acrylonitrile polymers can also be cast into the form of films by passing the solution from a hopper onto a rotating metallic surface under the smoothing action of a doctor blade. The solvent can be removed by any of the means well known in the art, for example, by a liquid bath containing a non-solvent for the polymer. In addition, molded articles can be prepared from the ethylene oxalate solutions of the present invention. Further, the ethylene oxalate solutions of acrylonitrile polymers as described in the instant invention, may be employed as lacquers, coating materials, etc. Numerous other advantages of the present invention will be apparent to those skilled in the art.

It is to be understood that changes and variations may be made without departing from the spirit and scope of the invention as defined in the appended claims.

We claim:
1. A new composition of matter comprising a homogeneous miscible mixture of ethylene oxalate and a polymer of monomeric substances of which acrylonitrile is at least 70% of the polymerizable content.
2. A new composition of matter as defined in claim 1 wherein the polymer is polyacrylonitrile.
3. A new composition of matter as defined in claim 1 wherein the polymer is a copolymer containing by weight in polymerized form 95% acrylonitrile and 5% vinyl acetate.
4. A new composition of matter as defined in claim 1 wherein the polymer is a copolymer containing by weight in polymerized form from 90 to 98% acrylonitrile and from 2 to 10% of a vinyl pyridine.
5. A new composition of matter as defined in claim 1 wherein the polymer is a blend comprising a binary interpolymer containing by weight in polymerized form from 90 to 98% acrylonitrile and from 2 to 10% of vinyl acetate, with a sufficient quantity of a binary interpolymer containing by weight in polymerized form from 10 to 70% of acrylonitrile and from 30 to 90% of 2-vinylpyridine, to give an overall 2-vinylpyridine content of 3 to 8% by weight.
6. A new composition of matter as defined in claim 1 wherein the polymer is a terpolymer containing by weight in polymerized form at least 2% vinyl acetate, from 90 to 94% of acrylonitrile, and from 4 to 8% of 2-methyl-5-vinylpyridine.
7. A process for preparing a fiber-forming solution comprising mixing a polymer of monomeric substances of which acrylonitrile is at least 70% of the polymerizable content with ethylene oxalate and then heating the mixture to a temperature within the range of 135° to 200° C.

References Cited in the file of this patent

UNITED STATES PATENTS 2,721,112  Downing et al. _____ Oct. 18, 1955

FOREIGN PATENTS 638,331  Great Britain _____ June 7, 1950